United States Patent [19]

Stevens

[11] 3,752,248
[45] Aug. 14, 1973

[54] HYDRAULIC STEERING SYSTEM
[75] Inventor: Daryl Stevens, Battle Creek, Mich.
[73] Assignee: Clark Equipment Company, Buchanan, Mich.
[22] Filed: Aug. 31, 1971
[21] Appl. No.: 176,562

[52] U.S. Cl................. 180/79.2 R, 60/388, 91/368
[51] Int. Cl.............................................. B62d 5/06
[58] Field of Search................. 180/79.2 R; 60/52 S, 60/388; 91/368

[56] References Cited
UNITED STATES PATENTS

| | | | |
|---|---|---|---|
| 3,602,326 | 8/1971 | Garrison | 180/79.2 R |
| 3,101,808 | 8/1963 | Gordon | 180/79.2 R |
| 3,323,610 | 6/1967 | Kress et al. | 180/79.2 C |
| 2,252,660 | 8/1941 | Kulikoff | 180/79.2 R |
| 3,672,460 | 6/1972 | Takata | 180/79.2 B |
| 2,509,953 | 5/1950 | Baldwin | 180/79.2 R |
| 3,080,175 | 3/1963 | DeMarco | 280/95 R |

FOREIGN PATENTS OR APPLICATIONS

| | | | |
|---|---|---|---|
| 527,013 | 10/1940 | Great Britain | 180/79.2 R |

Primary Examiner—Benjamin Hersh
Assistant Examiner—Leslie J. Paperner
Attorney—Marmaduke A. Hobbs et al.

[57] ABSTRACT

A hydraulic steering system for vehicular equipment, such as lift trucks, earth moving equipment, and the like, having two steerable wheels, an axle bed for the wheels and a linkage interconnecting the wheels, in which the steerable wheels are operated by power cylinders connected to the axle bed and to the linkage, and a valve controls a fluid under relatively high pressure for operating the two cylinders. A pilot cylinder normally operating under a relatively low pressure is controlled by a remotely positioned metering pump responsive to the operation of the steering wheel by the operator. The pilot cylinder is connected to the linkage and to the steering valve to provide a follow-up effect through the pilot cylinder and steering valve. This system permits the use of a relatively high pressure sub-system for operating the power cylinders and a relatively low pressure sub-system controlled by the operator at a position remote from the steering mechanism for controlling the power cylinders.

12 Claims, 3 Drawing Figures

Patented Aug. 14, 1973
3,752,248
2 Sheets-Sheet 1
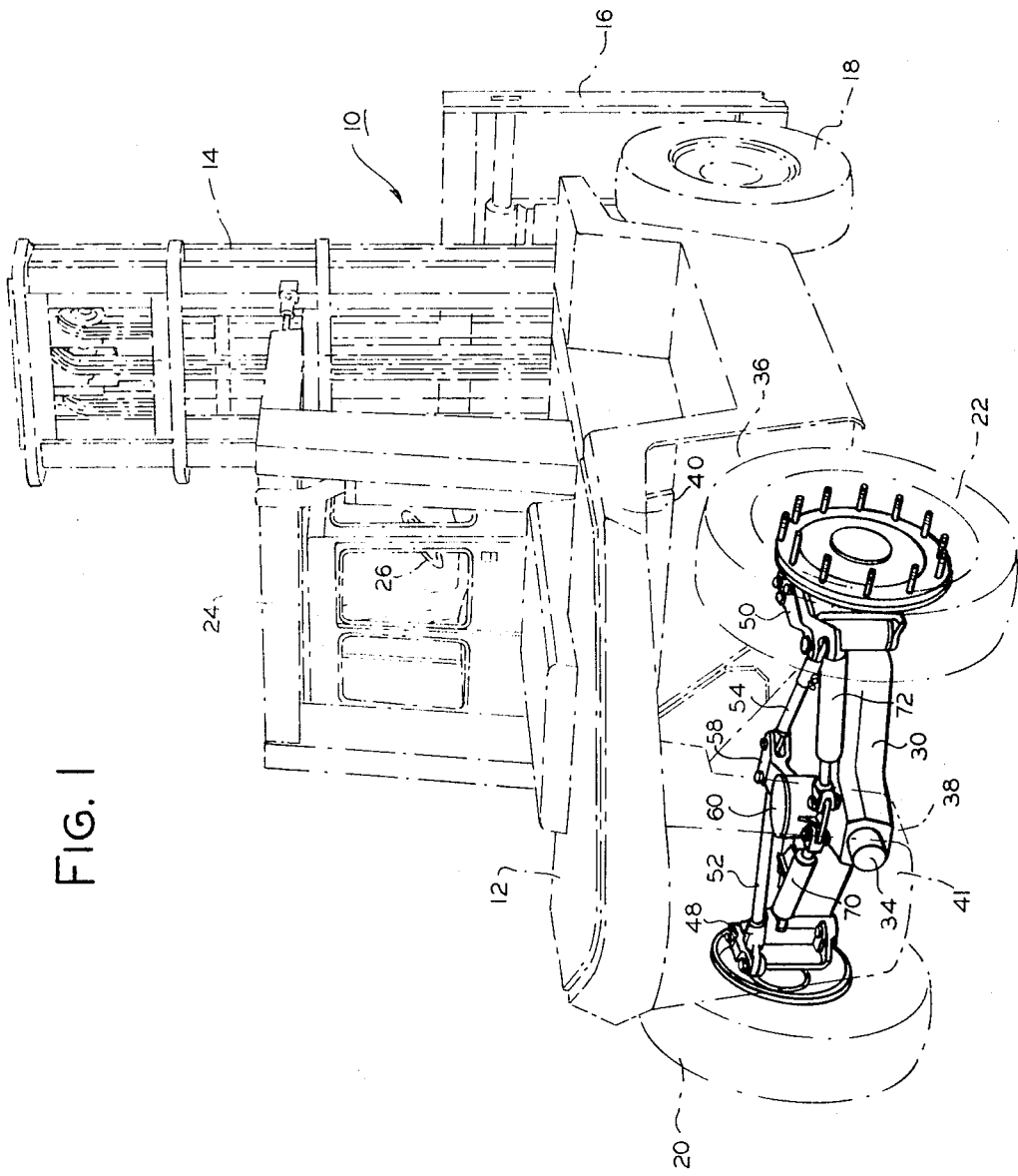
FIG. I
INVENTOR
DARYL STEVENS
BY Hobbs & Green
ATTORNEYS

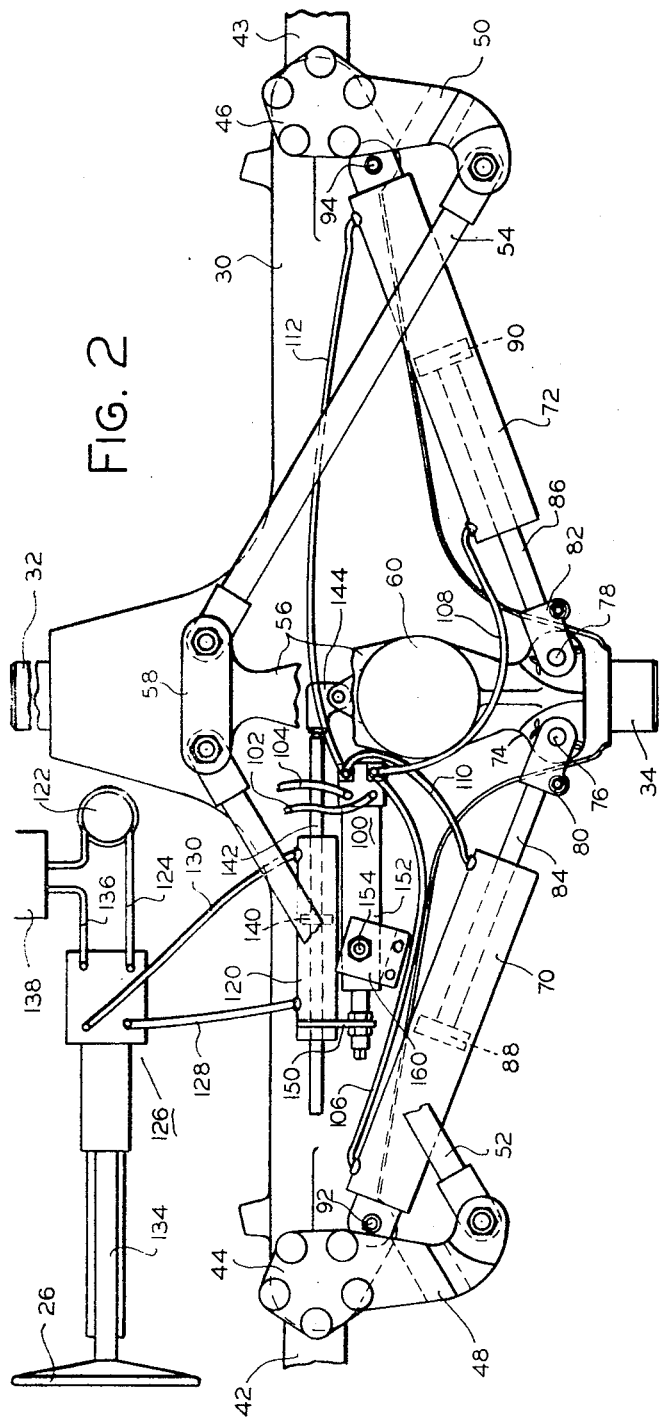
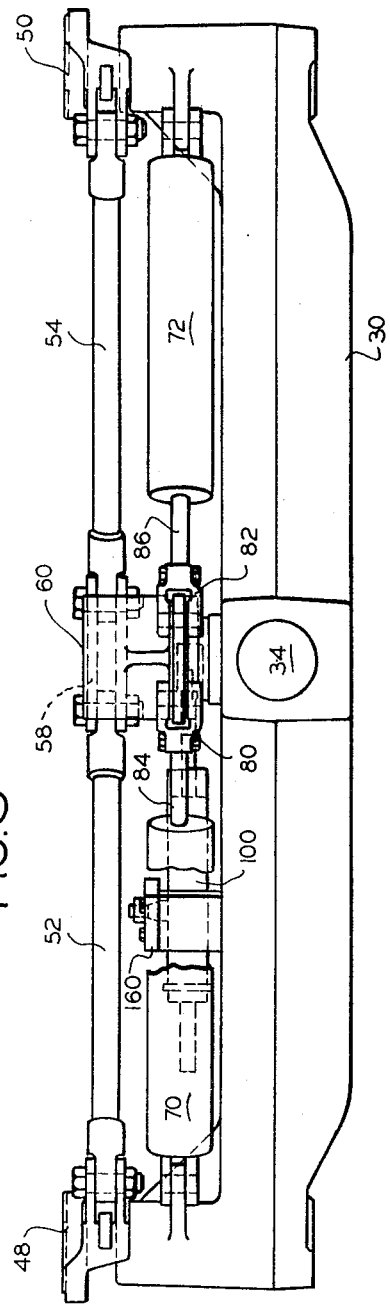

HYDRAULIC STEERING SYSTEM

In hydraulic steering systems for land vehicles, a metering pump, usually of the gerotor type, performs both the operation of supplying the operating fluid to the power cylinders for steering the wheels and the metering of the fluid required to perform the steering operation. While this type of hydraulic steering system is satisfactory for conventional trucks, tractors and small or medium sized earth moving equipment, large vehicles and equipment of these types require such a large volume of fluid for operating the power cylinders, that the combined metering and power fluid pump, the fluid lines from the pump to the power cylinders, and the fluid return lines must necessarily be of large capacity. Since the operator's compartment and the engine on the large equipment are often remote from the operating cylinders of the steering system, the large capacity lines, which include heavy couplings and long sections of flexible hose, are inconvenient and costly to install, operate and maintain, and the large volume of fluid handled by the system enchances the service requirements and maintenance cost. It is therefore one of the principal objects of the present invention to provide a hydraulic steering system primarily for use on large vehicles and heavy vehicular equipment, in which one sub-system of large fluid volume operates the power cylinders for steering the wheels, and another subsystem of relatively low fluid volume actuated by the operator, controls the operation of the first sub-system, and in which the first sub-system is located in close proximity to the power cylinders, and the second sub-system includes controls located conveniently to the operator, regardless of the remoteness of the cab from the steerable wheels.

In large material handling equipment the axle on which the steerable wheels are mounted has a center pin mounting to allow the axle to articulate to compensate for rough and uneven surfaces, and is of massive construction to withstand heavy loads under adverse operating conditions without permanent deflection. Notwithstanding the articulated and massive construction of the axle, it is highly desirable to have high angular turning in order to obtain maximum maneuverability. It is therefore another object of the present invention to provide a hydrostatic steering system for use with an articulated, massive axle, which can be mounted on the axle structure without any principal part thereof being mechanically connected to the frame of the vehicle, and which has a high degree of versatility and provides maximum maneuverability of the vehicle, with a follow-up effect being produced through a pilot cylinder and steering valve controlling the system.

Still another object is to provide a complete hydrostatic steering system for large vehicles and heavy vehicular equipment which, because of the size and weight of the vehicle or equipment, requires a large volume of fluid to operate the power cylinders for steering, but which effectively utilizes only a relatively small volume of fluid to control the fluid operating the power cylinders.

A further object of the invention is to provide a steering system of the aforesaid type which is relatively simple in construction and operation, and which can be relatively easily installed during construction of the vehicle or equipment on which it is used, and which can be conveniently and readily serviced in the field.

Additional objects and advantages of the invention will become apparent from the following description and accompanying drawings, wherein:

FIG. 1 is a phantom perspective view of a fork lift truck embodying the present hydrostatic steering system;

FIG. 2 is a top plan view of the present hydrostatic steering system, showing the axle bed and the operating mechanism connected to the steerable wheels and the system connected to the steering wheel; and FIG. 3 is a front elevational view of the steering mechanism shown in FIG. 2.

Referring more specifically to the drawings, numeral 10 indicates generally a fork lift truck having a frame 12, upright 14 mounted on the front of the frame, and attachment 16 mounted on the upright. The attachment may be one of a number of different types for performing a variety of different operations. The two front wheels 18 are driven wheels, and wheels 20 and 22 at the rear are steerable wheels. The cab 24 for the operator contains the controls for the operation of the lift truck including the steering wheel 26. While the present hydraulic steering system is designed for lift trucks, it can be used on different type vehicles and vehicular equipment, and is particularly advantageously used on large equipment such as earth moving equipment where the operator's cab or seat is remotely positioned from the steerable wheels.

The steerable wheels 20 and 22 are mounted on axle bed 30, which is pivoted at the front and rear to the frame on trunnions 32 and 34 journalled in bearings on the main frame 12. The forward and rear trunnions 32 and 34 are supported in downwardly extending frame members 36 and 38 rigidly connected to one another by a horizontally disposed frame member 40 to form a rigid structure above the axle bed. A counterweight 41 is frequently used in conjunction with lift trucks such as the one illustrated in the drawing which are adapted to handle heavy loads, and is normally mounted on frame member 38.

Wheels 20 and 22 are mounted on axles 42 and 43, respectively, the axles being connected for angular movement to knuckles 44 and 46 pivoted to the outer ends of the axle bed 30. The two knuckles are connected to each other through steering arms 48 and 50, tie rods 52 and 54, and a spider 56. The two tie rods are pivotedly connected to the respective arms 48 and 50 and to spider arm 58. The spider is pivotedly mounted on axle bed 30 by boss 60 in the center of the axle bed, thus permitting the spider to oscillate in either lateral direction as the steering mechanism is operated.

The steerable wheels are operated by hydraulic cylinders 70 and 72, each being connected to rear arm 74 of spider 56 by pivot pins 76 and 78, the two pivot pins being connected by fixtures 80 and 82 to piston rods 84 and 86 of pistons 88 and 90 in cylinders 70 and 72. The outer ends of the cylinders are pivotedly anchored to steering axle bed 30 by pins 92 and 94, respectively. Thus, operation of the cylinders in either direction causes the spider to rotate laterally one way or the other and, through connecting rods 52 and 54 and arms 48 and 50, causes the steerable wheels to turn in one direction or the other.

The present hydraulic steering system includes a power system and a pilot system for controlling the power system, with most of the principal operating parts thereof being mounted on the axle bed. Relatively short lines are provided between the supply pump and the steering valve, and between the steering valve and the actuating cylinders, wherein a relatively large volume of fluid under high pressure is utilized. The pilot or master system is connected to the steering mechanism in the operator's cab and controlled by the steering wheels through relatively long, but small, lines with fluid under relatively low pressure. The two cylinders 70 and 72 are controlled by steering valve 100, which controls hydraulic fluid under high pressure delivered through line 102 from a pump mounted on the frame of the vehicle. A return line 104 for fluid discharged from the pistons is connected to a return tank from which the fluid is pumped for actuating the cylinders. The steering valve 100 is connected to the left hand end of the hydraulic cylinders 70 and 72 by lines 106 and 108, and to the right hand end of the respective cylinders by lines 110 and 112. Fluid delivered to the left hand end of cylinders 70 and 72 causes the pistons 88 and 90 to move to the right, as viewed in FIG. 2, rotating the spider 56 in the counterclockwise direction. The two tie rods are thus moved to the left, causing arms 48 and 50 to move in the clockwise direction, thereby turning the wheels on axles 42 and 43. When pressure is applied to the right hand end of cylinders 70 and 72, the piston is moved to the left, thus returning the fluid in the left hand end of the respective cylinders to the steering valve 100 and thence through line 104 to the return tank. Thus the vehicle is steered to the right or left by fluid being admitted under pressure to the left or right ends of the two cylinders 70 and 72 through lines 106 and 108 or through 110 and 112.

Valve 100, which controls the power supply to cylinders 70 and 72, is controlled by a servo or pilot cylinder 120 which receives its supply of fluid at a relatively low pressure from a supply pump 122, through fluid line 124, metering pump 126, and lines 128 and 130 connected at opposite ends of cylinder 120. A metering pump of the "gerotor" type, known in the trade as the "Char-lynn" pump, is preferably used. The metering pump is controlled by the operator through steering wheel 26, and steering column 134, which in turn is connected to the metering pump. The return line 136 connects the metering pump 126 to a fluid supply tank 138.

Rotation of the steering wheel 26 in either direction causes the fluid to flow through one of the two lines 128 or 130 to move the cylinder 120 either to the right or left. Cylinder 120 contains a piston 140, which is connected by a rod 142 and a fixture 144 to spider 56, so that a change in pressure in cylinder 120 causes the cylinder to move either to the right or left relative to spider 56. Pilot cylinder 120 is connected to steering valve 100 by an arm 150; thus movement of the pilot cylinder actuates the steering valve 100 which includes a spool valve element in the hydraulic portion 152 and a mechanical ball stud actuator 154 in the mechanical actuator housing, the ball stud being adapted to actuate valve 100 in a follow-up motion as the power cylinders turn the rear wheels in the manner previously described herein, through spider 56 and tie rods 52 and 54 and steering arms 48 and 50. The steering valve of the type used in this system is readily available on the market, one suitable type being the Vickers hydraulic leakage power steering valve series "SV 20". The ball stud actuator 154 is secured to a fixture 160 rigidly secured to the axle bed 30 so that movement of cylinder 120 causes the stud actuator to move in one direction or the other to admit fluid into power cylinders 70 and 72. In this system, the combination of the servo-system and the power cylinders system, small hydraulic lines supply fluid for actuating the servo-cylinder 120, which in turn mechanically actuates steering valve 100 for controlling the large volume of hydraulic fluid for operating power cylinders 70 and 72. The connection of the piston 140 and pilot cylinder 120 to spider 56 results in a follow-up effect, giving the operator "feel" control during the steering operation.

In the operation of the present hydraulic steering system, starting with the pump 122 in operation and pressure supplied to steering valve 100 through line 102, as the operator turns steering wheel 26, the metering pump 126 operates to control the flow of the low pressure fluid through lines 128 or 130 to either end of pilot cylinder 120, thus causing the cylinder to move bodily either to the right or left and to actuate steering valve 100 through the ball stud actuator 154. The actuation of the steering valve admits fluid to the coresponding end of power cylinders 70 and 72, thus moving spider 56 angularly, which in turn moves tie rods 52 and 54 and arms 48 and 50 in the direction to steer the rear wheels 20 and 22. When the operator ceases to turn the steering wheel, the metering pump 126 ceases to deliver fluid to pilot cylinder 120, and hence actuation of steering valve 100 ceases, and the steering valve interrupts the flow of hydraulic fluid to the two power cylinders. Rotation of the steering wheel in the opposite direction reverses the operation of pilot cylinder 120, thus causing actuation of the steering valve in the direction to deliver fluid to the opposite end of power cylinders 70 and 72, moving the spider, tie rods and steering arms in the direction to steer the rear wheels 20 and 22 in the opposite direction. In view of the follow-up action through the pilot cylinder and the steering valve, the rear wheels are retained in any angular position in which the power cylinders move them, thereby providing effective control of the steering operation by the operator through the dual hydraulic system involving the pilot cylinder and steering valve.

In addition to the advantage obtained by the use of the small, relatively low pressure servo-system to control the main hydraulic power system for operating the steering wheel, the present mechanical operating mechanism is mounted on the steering axle bed, thus providing great versatility to the axle and steerable wheels without any mechanical linkage to the frame other than the two trunnions 32 and 34 and the flexible hydraulic lines between the power pump and steering valve 100 and metering pump and pilot valve 120. Although the present hydraulic steering system has been described in detail with reference to a lift truck, it can readily be adapted to various types of heavy equipment, such as earth moving equipment, vehicles for handling shipping containers, and similar large vehicular equipment.

Only one embodiment of the present hydraulic steering system has been described in detail herein; however, various changes and modifications may be made without departing from the scope of the invention.

I claim:

1. A hydraulic steering system for vehicular equipment having an operator controlled steering means, two steerable wheels, an axle bed for the wheels and a linkage interconnecting said wheels: said system comprising a hydraulic motor means connected to said linkage, a source of hydraulic fluid under relatively high pressure, a line connecting said source with said motor means, a steering valve disposed in said line and mounted on said axle bed for controlling the operation of said motor means, a hydraulic pilot cylinder means mounted on said axle bed and having two relatively movable operating parts for actuating said valve, means connecting one of said parts to said steering valve, means connecting the other of said parts to said linkage for obtaining a follow-up effect through said cylinder means and valve, a fluid supply means for said pilot cylinder means, and a fluid metering means controlled by said steering means for controlling the flow of fluid in said fluid supply means and thereby controlling said pilot cylinder means.

2. A hydraulic steering system for vehicular equipment as defined in claim 1 in which said fluid metering means controlled by said steering means consists of a metering pump.

3. A hydraulic steering system for vehicular equipment as defined in claim 1 in which said hydraulic motor means consists of two hydraulic cylinders, each connected to the axle bed and having pistons connected by rods to said linkage.

4. A hydraulic steering system for vehicular equipment as defined in claim 3 in which said relatively movable parts of said hydraulic pilot cylinder means include a piston and a piston rod, means connecting said piston rod to said linkage, and means connecting the cylinder of said cylinder means to said steering valve.

5. A hydraulic steering system for vehicular equipment as defined in claim 4 in which said fluid metering means controlled by said steering means consists of a metering pump.

6. A hydraulic steering system for vehicular equipment as defined in claim 1 in which the linkage includes a spider mounted on said axle bed and movable angularly on a horizontal axis, and a tie rod and steering arm connecting the spider with the axle of each steerable wheel, and in which said hydraulic motor means consists of cylinder means having one end anchored on said axle bed and the other end connected to said spider.

7. A hydraulic steering system for vehicular equipment as defined in claim 6 in which said hydraulic motor means includes a piston rod pivotedly connected to said spider.

8. A hydraulic steering system for vehicular equipment as defined in claim 7 in which said fluid metering means controlled by said steering means consists of a metering pump.

9. A hydraulic steering system for vehicular equipment as defined in claim 1 in which said relatively movable parts of said hydraulic pilot cylinder means include a piston and a piston rod, means connecting said piston rod to said linkage, and means connecting the cylinder of said cylinder means to said steering valve.

10. A hydraulic steering system for vehicular equipment as defined in claim 9 in which the linkage includes a spider mounted on said axle bed and movable angularly on a horizontal axis, and a tie rod and steering arm connecting the spider with the axle of each steerable wheel, and in which said hydraulic motor means consists of cylinder means having one end anchored on said axle bed and the other end connected to said spider.

11. A hydraulic steering system for vehicular equipment as defined in claim 10 in which said hydraulic motor means includes a piston rod pivotedly connected to said spider.

12. A hydraulic steering system for vehicular equipment as defined in claim 11 in which said fluid metering means controlled by said steering means consists of a metering pump.

* * * * *